United States Patent Office 3,576,914
Patented Apr. 27, 1971

3,576,914
THERMAL DEHYDROCHLORINATION OF POLY-VINYL CHLORIDE AND GRAFT COPOLYMERS THEREFROM
Frank J. Donat, Cleveland, Ohio, assignor to The B. F. Goodrich Company, New York, N.Y.
No Drawing. Continuation-in-part of application Ser. No. 553,629, May 31, 1966. This application May 26, 1969, Ser. No. 828,004
Int. Cl. C08f 15/28
U.S. Cl. 260—884                                              7 Claims

ABSTRACT OF THE DISCLOSURE

Porous poly(vinyl chloride) resin is subjected to a specific method of dehydrochlorination. This unsaturated material is then converted by graft polymerization to hitherto unattainable levels of percent grafting efficiencies.

CROSS REFERENCE TO RELATED APPLICATION

This application is a continuation-in-part of Ser. No. 553,629 filed May 31, 1966, now abandoned.

BACKGROUND OF THE INVENTION

This invention relates to superior graft polymers based on a backbone structure of poly(vinyl chloride). More particularly it relates to the preparation of compositions comprising graft polymers based on porous poly(vinyl chloride) backbone structures wherein much higher amounts of the grafting monomer become attached as grafted polymer to the backbone polymer than in compositions known in the prior art.

In the consideration of this invention certain terms are used which are defined herein as follows:

"Graft polymer," or "graft copolymer" is a polymer in which the molecule has a main backbone polymer chain of atoms with chemically attached to it at frequent intervals, polymeric side chains containing different atoms or groups from those in the main chain. The main chain may be derived from either a copolymer or a homopolymer, but must contain points of unsaturation prior to the grafting. The side chains are polymer based on monomer or monomers which are different from at least one monomer in the backbone polymer and are herein known as grafted polymer. The products of this invention are true graft polymers of grafted polymer on backbone polymer.

"Over polymer," or "over copolymer" is a polymer in which the molecule has a base polymer chain of atoms with other polymer chains containing different atoms or groups from those in the base chain primarily physically associated with it. The base chain may be derived from either a copolymer or a homopolymer, but it must be chemically fully saturated. Prior art over polymers on saturated poly(vinyl chloride) backbone have occasionally been called graft polymers, but herein are denoted as over polymers.

"Backbone polymer" is the main chain polymer of a graft polymer. It is unsaturated and subject to chemical attachment in the formation of a graft polymer.

"Base polymer" is the main chain polymer of an over polymer. It is saturated and virtually immune to chemical attachment in the formation of an over polymer.

"Graft monomer" is a monomer different from the monomer or at least one of the monomers that polymerized to form the backbone structure of graft polymer as defined above and is attached in its polymeric form only to previously unsaturated backbone structures. It becomes chemically attached to the backbone, in its polymeric form, both at many points of unsaturation in the backbone created by the practice of this invention and at the relatively few points where by a transfer mechanism the monomer succeeds in abstracting a hydrogen, and/or halogen from the backbone polymer.

"Over monomer" is a monomer different from the monomer or monomers that polymerized to form the base chain and, in polymerized form, is not considered to be attached to but is, rather, only associated with saturated base chain structure. It is chemically attached to the base chain at only the relatively few points where by a transfer mechanism the monomer abstracts a hydrogen and/or halogen from the backbone polymer.

"Chemically attached polymer" is polymer bound to the backbone polymer by a chemical bond so that it is not soluble in an appropriate solvent which dissolves the same polymer when it is free from, or not attached to, a backbone structure. Polystyrene is soluble in alpha, alpha, alpha-trifluoro toluene. Poly(vinyl chloride) is not soluble in this solvent. Polystyrene, as an over monomer on PVC is removed therefrom by the solvent. Polystyrene, as a grafted polymer on PVC, is not soluble in the solvent.

Percent grafting efficiency is defined by the following formula:

Percent grafting efficiency $$= \frac{\text{total wt. of non-PVC polymer} - \text{wt. of extracted homopolymer}}{\text{total wt. of non-PVC polymer}} \times 100$$

$$= \frac{\text{wt. of non-PVC polymer grafted on to substrate}}{\text{total wt. of non-PVC polymer}} \times 100$$

Poly(vinyl chloride) is a large volume commercial resin employed in the manufacture of films, coatings, and rigid shapes such as pipe and various molded and extruded articles. Initial resins developed for large scale commercial use were prepared by emulsion polymerization techniques. Particles from this process, while fine in size, are spherical and hard surfaced, analogous to very minute marbles. It is relatively difficult to dissolve such particles in plasticizers and other solvents and to graft other monomers thereon by graft polymerization, and gradually, the emulsion polymerization resins have been superseded in the market place by the so-called porous, granular, easy processing poly(vinyl chloride) resins produced by suspension and bulk polymerization techniques. These resins have more porous particles than those of the emulsion process; they are analogous to open cell sponge. The particles are channeled with capillaries and take up plasticizer and dissolve in solvents to form cements more readily than do the earlier resins. Wider usage of poly(vinyl chloride) will be posible if further improvements can be made in its relatively poor thermal stability and weatherability. Improved optical clarity and better processibility at higher temperatures are also urgently desired. Other polymers presently have these desired properties and property levels but they in turn, are more costly than PVC and lack some of the better properties of PVC. Blends of polymers often show a favorable balance of properties of the blended components. Another method to obtain a balance of properties between 2 polymeric materials is to prepare graft polymers.

Prior art attempts at graft and over polymerization, which are defined above, as well as attempts at copolymmerization in order to effect the improvements in poly (vinyl chloride) referred to above have resulted in only marginal success. A major reason for this limited success is the great stability of poly(vinyl chloride) to chemical attack which largely stems from the low unsaturation of the polymer chain. The percent grafting efficiencies obtained in a reaction of this kind are low, usually less than 40% although the inventor has achieved as high as 57% grafting efficiency in one case when using the extremely reactive monomer vinyl acetate in combination with the efficient catalyst azoisobutyronitrile.

It is known in the art to dehydrohalogenate poly(vinyl chloride) by heating the polymer in solution, emulsion or in the solid state with organic or inorganic bases in an inert atmosphere. The dehydrochlorination occurs uniformly around the surface of the spherical particle. However, it is found to be very difficult to dehydrochlorinate porous poly(vinyl chloride) particles uniformly. Uniform dehydrochlorination in solution is possible of course, but the solvents that have to be employed to dissolve poly (vinyl chloride) all have high chain transfer constants, introduce handling problems and reduce the percent grafting efficiencies that can be obtained in graft polymerization. When the nonporous resin with marble-like particles is dehydrochlorinated most of the unsaturation produced tends to be at the particle surface. The particle interior remains largely unsaturated and subsequent attempts at graft polymerization yield low percent grafting efficiencies. When porous poly(vinyl chloride) is subjected to prior art methods of dehydrochlorination, the capillaried particles are more completely dehydrochlorinated than the marble-like particles of nonporous poly(vinyl chloride) but attempts at graft polymerization thereon result in low grafting efficiencies because the unsaturation produced is still not uniformly distributed through out the resin particle. The catalysts (bases) employed do not get uniformly into the particle and, once in the particle, cause continuing dehydrochlorination which is undesirable.

Another method for dehydrochlorinating poly(vinyl chloride) is to react a strong base such as caustic potash with the resin in the presence of an alcoholic compound, preferably a partial ether of glycol such as mono-methyl ether of ethylene glycol or monoethyl ether of diethylene glycol. These ethers swell porous resin particles objectionably for the purpose intended and block attempts at later achieving high percent grafting efficiencies because the base catalyst for dehydrochlorination is blocked from reaching the interior of the resin particles. Other dehydrohalogenating agents that can be used include quaternary ammonium bases such as benzyl trimethyl ammonium hydroxide. Ammonia in contact with poly(vinyl chloride) at elevated temperatures forms undesirable polyvinyl amine. To avoid this, it is known to perform dehydrochlorination of the resin with ammonia in solution in an inert solvent. The dehydrochlorinated poly(vinyl chloride) resins of the prior art have been subjected to alleged graft polymerization of monomers such as methyl acrylate, but the final so-called graft polymers exhibit properties which are only slightly changed from the values of the same properties on the backbone poly(vinyl chloride) itself, a result which is not unexpected in view of high chain transfer constant solvents which are used.

Higher percent grafting efficiencies have been obtained on porous poly(vinyl chloride) than on nonporous resins. Still higher percent grafting efficiencies can be obtained on dehydrochlorinated porous poly(vinyl chloride), unless high chain transfer constant solvents are employed, but the problem with these prior art materials is that the percent grafting efficiencies obtained are still something less than 40% and the resins tend to retain a color which results from residual unsaturation.

The method of this invention results in the production of porous poly(vinyl chloride-g-polymer) resins showing greatly increased percent grafting efficiencies compared to results formerly obtained on porous poly(vinyl chloride) resins, that is, those which are made by suspension or bulk polymerization, not by emulsion or solution polymerization. Depending upon the particular catalyst and graft monomer employed, percent increases in percent grafting efficiency ranging from 57% to 1382% are obtained. The method of the invention calls for initial dehydrochlorination of the porous resin by a noncatalyzed thermal technique which results in the resin particles being uniformly dehydrochlorinated without formation of undesirable gel although they do develop a color from the unsaturation which develops. An extra advantage of this process over other dehydrochlorination methods is the ease of recovery of the hydrogen chloride for further use. When the graft monomer is polymerized onto the uniformly dehydrochlorinated colored resin, percent grafting efficiencies of greater than 60% are achieved and the resin reverts from colored to white and films prepared therefrom are clear and transparent.

True graft polymers based on porous particle poly (vinyl chloride) backbones have been prepared by the process of this invention which overcome the listed shortcomings of the parent resin and considerably broaden the usage of poly(vinyl chloride). These compositions evidence a much higher and more efficient polymerization as graft polymer of the graft monomer than do graft polymerizations on poly(vinyl chloride) of the prior art when percent grafting efficiencies are calculated.

The percent increase of percent grafting efficiency achieved in the practice of this invention compared to over polymerization attempts in the prior art means that the graft monomer is used more efficiently and with less waste than are over monomers as employed in the art.

When saturated porous poly(vinyl chloride) is used as a backbone chain, and styrene, for example, is used as an over monomer in a suspension system, only about 10 percent of the polystyrene formed by polymerizing a 50–50 mixture of poly(vinyl chloride) and styrene at 60° C. cannot be extracted and is, thus, presumably chemically bonded to the poly(vinyl chloride) chain by transfer and abstraction of hydrogen or halogen from the backbone polymer. About 90% of the styrene made available to form grafted polymer on the backbone resin is recovered as polystyrene homopolymer. Under normal conditions in this instance the transfer process competes for radicals with homopolymerization of styrene monomer and termination of styrene polymer chains by combination. The polymerization reaction of styrene onto the backbone chain is not favored statistically because of the size, immobility and steric hindrance of the polymer chains or chemically because of inertness of poly(vinyl chloride), and relatively little chemical bond grafting takes place in a system of this kind. In contrast, in the practice of this invention when 50 parts of styrene are polymerized in the presence of 100 parts of unsaturated porous poly(vinyl chloride) at 50° C.–65° C., as high as 90% or better of the available styrene can become polymerized and chemically bonded to the backbone polymer as grafted polymer and less than 10% of the styrene is then recoverable by extraction with a solvent.

It has been known in the art to partially dehydrochlorinate emulsion process poly(vinyl chloride) resin by heating it in solution or suspension with a base or other catalyst. When these methods are used with the porous resins prepared by suspension and bulk polymerizations, it is surprisingly found that many bases do not accomplish the dehydrochlorination uniformly throughout the resin particles suspended in a system such as alcohol. Bases such as sodium carbonate, ammonium hydroxide and calcium hydroxide are ineffective. Sodium hydroxide, and potassium hydroxide are partialy effective, but are found to dehydrochlorinate mainly the surface of the resin particle. There is a strong tendency to formation of undesirable gel and this tendency appears to increase as the dehydrochlorination is increased. If the resin particles are not uniformly dehydrochlorinated the effects become evident when, later a graft polymerization is attempted. The graft monomer polymerizes, but fails to chemically attach as polymer to the poly(vinyl chloride) backbone chain in significantly great amounts. To achieve effective graft polymerization on the backbone resin, this resin must not be dehydrochlorinated to the point where gel formation becomes a problem and the resin particles must be uniformly dehydrochlorinated throughout the porous particle, not just on the external surface. Less than 10%, preferably less than 5% of the available hydrogen chloride should be removed.

Uniform dehydrochlorination of capillaried, porous open sponge-like poly(vinyl chloride) particles is obtained by using an exclusively thermal process. Heat alone is used. Uniformity of results is achieved by keeping the resin particles circulating in a fluid medium as the heat is applied. For dry resins a gaseous fluid such as nitrogen may be employed. For liquid systems, an ideal resin circulating fluid is ethylene glycol. As no catalysts or ethereal solvents and the like are employed, the dehydrochlorination of the resin proceeds uniformly, without build-up of gel or swelling of the particles to block off the capillary channels to the particle interiors.

An infinite variety of chemical modifications of poly(vinyl chloride) can be made. Each modification is mainly poly(vinyl chloride) but enough graft monomer can be grafted thereon for the product to exhibit properties of the graft polymer. Further modification of the unsaturated backbone is possible by conversion of the double bonds in the backbone chain to hydroxyl groups, as by treatment with potassium permanganate, lead tetraacetate and the like, which yields a resin more sensitive to water and more adhesive than poly(vinyl chloride). Sulfonation of the double bonds with sulfuric acid gives a resin with excellent ion exchange properties. Halogenation, especially chlorine saturation of the double bonds, enhances thermal, chemical, and light stability and high temperature rigidity of poly(vinyl chloride).

The desirable properties of various high cost non-poly(vinyl chloride) polymers can be imparted to low cost porous poly(vinyl chloride) by grafting these polymers onto unsaturated poly(vinyl chloride) chains prepared as described herein. Grafts of fluorinated polymers improve thermal stability, weatherability, chemical resistance and impart lubricity to the poly(vinyl chloride). Grafts of polymethacrylate improve optical properties. Grafts of poly(ethylene) improve processibility. Grafts of poly(styrene) improve processibility as in molding; grafts of poly(vinyl acetate) can be modified to poly(vinyl alcohol) side chains which impart water adhesive properties to the backbone poly(vinyl chloride).

When a graft or over polymerization of a monomer on a preformed polymer backbone is run, an excess of the monomer is usually employed to insure that the maximum chemical bonding to the backbone is achieved. Unreacted monomer, and unattached homopolymer can be removed by suitable solvents which do not dissolve either poly(vinyl chloride) or poly(vinyl chloride-g-polymer). Analysis can determine what weight percent of the total graft polymer is backbone polymer and what weight percent is grafted side chain polymer.

The amount of graft polymerization, measured by percent grafting efficiency, which takes place on a porous poly(vinyl chloride) substrate is proportional to the level of unsaturation in that substrate and approaches 100 percent when even as little as 0.6 percent of the chlorine normally present in poly(vinyl chloride) is removed as HCl.

SUMMARY OF THE INVENTION

In this invention graft polymerizations are carried out by insuring intimate contact of graft monomer and the entire available surface of the unsaturated porous poly(vinyl chloride) resin particle. The graft polymerization can be conducted with the unsaturated porous poly(vinyl chloride) resin in the dry state—in which it absorbs or soaks up the monomer—initiator mixture, or, if it is desired to employ a fluid system, the resin is suspended in water and the monomer—initiator mixture is added thereto. The resin particles are then preferably graft polymerized in water suspension. The composition of the polymeriaztion products is determined by chlorine analysis. This is possible when poly(vinyl chloride) is the only component in the mixture that contains chlorine. Any non-poly(vinyl chloride) homopolymer formed during the the grafting process is extracted with a solvent which dissolves said homopolymer, but not poly(vinyl chloride) or its graft.

The porous poly(vinyl chloride) resins included herein as backbone polymers are the homopolymers of vinyl chloride, and copolymers and interpolymers of at least 70% by weight of vinyl chloride and up to 30% by weight of one or more various other vinyl monomers copolymerizable with vinyl chloride prepared in bulk or suspension systems. Resins prepared in emulsion or solvent polymerization systems do not form the porous resin particles needed for most efficient graft polymerization. For the purpose of this invention the other vinyl monomers which may be included in addition to the essential vinyl chloride in the polyvinyl chloride resins are those having a $CH_2=C<$ grouping. Such monomers include the other vinyl halides such as vinyl bromide, vinyl fluoride, vinylidene chloride, vinylidene bromide, vinylidene fluoride, chlorotrifluoro ethylene, 1,2-dichloroethylene, and the like; the vinyl esters such as vinyl acetate, vinyl propionate, vinyl butyrate, vinyl benzoate, vinyl laurate, vinyl phosphate, isopropenyl acetate, isopropenyl caproate, and the like; the acrylate and methacrylate esters such as methyl acrylate, ethyl acrylate, propyl acrylate, isopropyl acrylate, the butyl acrylates, the amyl acrylates, the hexyl acrylates, the heptyl acrylates, the octyl acrylates, the dodecyl acrylates, phenyl acrylate, cyclohexyl acrylate, methyl methacrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylate, cyclohexyl methacrylate and the like; the maleate and fumarate esters such as diethyl maleate, the dipropyl maleates, the dibutyl maleates, the diamyl maleates, the dihexyl maleates, the dioctyl maleates, the dilauryl maleates, dimethyl fumarate, diethyl fumarate, the dipropyl fumarates, the dibutyl fumarates, the diamyl fumarates, the dihexyl fumarates, the dibutyl fumarates, the dioctyl fumarates, the didecyl fumarates, dicyclohexyl fumarate, diphenyl fumarate and the like; the vinyl aromatic monomers such as styrene, alpha-methyl styrene, the vinyl toluenes, the vinyl xylenes, vinyl naphthalene, and the like; the monoolefins such as ethylene, propylene, the butylenes, the amylenes, the hexylenes, cyclohexene, and the like; the vinyl ethers such as vinyl methyl ether, vinyl ethyl ether, the vinyl propyl ethers, the vinyl butyl ethers, the vinyl amyl ethers, the vinyl hexyl ethers, the vinyl heptyl ethers, the vinyl octyl ethers, vinyl cyclohexyl ether, vinyl phenyl ether, vinyl benzyl ether, and the like; the allyl esters and ethers such as allyl acetate, allyl laurate, allyl benzoate, allyl methyl ether, allyl ethyl ether and the like; vinyl cyanides such as acrylonitrile, methacrylonitrile, vinylidene cyanide and the like and others.

Essential as backbone polymers for the practice of this invention are the porous, easy processing homopolymer resins of poly(vinyl chloride).

The same polymerizable vinyl monomers listed above may be employed as graft polymerization monomers on the unsaturated porous poly(vinyl chloride) chains in the practice of this invention.

At least 10 parts by weight of graft monomer per 100 parts of backbone unsautrated porous poly(vinyl chloride) resin should be used in the practice of this invention. Use of less than this amount of graft monomer usually results in not enough graft polymer being bonded to the backbone to affect the basic poly(vinyl chloride) properties even if 100% of the graft monomer actually bonds to the backbone. There is no theoretical upper limit to the amount of graft monomer to be used since the grafted polymer chains could continue to grow indefinitely. In practice, the upper limit of graft monomer employed is determined by one skilled in the art as the amount which does combine sufficiently with the unsaturated porous poly(vinyl chloride) resin to give a poly(vinyl chloride-g-polymer) material which exhibits property levels such as thermal stability, weatherability, and processibility indicative of the polymerized grafted polymer rather than of the poly(vinyl chloride).

A small amount of free radical initiator is employed as a catalyst in the graft polymerization step. Typical initiators include peroxides, azo compounds and redox catalysts. Preferred initiator materials include benzoyl peroxide, chlorinated benzoyl peroxide, dicumyl hydroperoxide, caprylyl peroxide, diisopropyl percarbonate, azoisobutyronitrile, and the like. Free radical initiator is employed in the range of about 0.01 part to 1.0 part per hundred parts of monomer. Polymerizations are preferably conducted in an inert, oxygen-free atmosphere.

Porous, easy processing poly(vinyl chloride) homopolymer and copolymer resins prepared by bulk and suspension systems are widely available on the market. They are thermoplastic, white powders and have specific gravities from about 1.35 to 1.40 at room temperature. They may contain added plasticizers, stabilizers, lubricants, coloring agents and fillers.

Suspension polymerization of vinyl chloride is usually a batch process conducted in a pressure vessel. Air is excluded and an inert atmosphere may be used. Monomers (1 part), water (2-3 parts), catalyst and suspending agent (a protective colloid) are charged. Polymerization is conducted at 125°–150° F. to about 70%–75% conversion. Useful catalysts include lauroyl peroxide, cumene hydroperoxide and the like. Useful colloids include gelatin, carboxymethyl cellulose and gum arabic. Catalyst is used in an amount of 0.05 to 2.0% by weight and colloid is used in amounts of 0.01 to 4.0% by weight of polymer obtained. The porous poly(vinyl chloride) particles are removed by filtration and can be dried before proceeding to the thermal dehydrochlorination step, although drying is not necessary. These polymeric resins may be uniformly dehydrochlorinated in a controlled fashion by gentle heating. Dehydrochlorination in the dry state by heat alone may be conducted at 150°–250° C. This step is preferably conducted in vacuum or in an inert atmosphere such as that of nitrogen. The degree of unsaturation obtained is controlled by (1) reaction time, and (2) reaction temperature. Development of a yellow to red or brown color during dehydrochlorination indicates that the polymer contains conjugated double bonds. If a fluid system is preferred for the dehydrochlorination step, a very effective system is to heat the porous poly(vinyl chloride) suspended in ethylene glycol to about 180° C. for about 6 hours. The ethylene glycol does not dissolve or swell poly(vinyl chloride); it is thermally stable with a boiling point of 197.2° C., and it is easily separated from the resin as by decanting or centrifuging and washing the glycol damp resin with water. In any system used, the temperature of dehydrochlorination must be lower than the melting point of the porous poly(vinyl chloride) resin.

When as little as 1% or less of the combined hydrogen chloride is removed from a porous poly(vinyl chloride) resin to uniformly create unsaturation therein, tremendous increases in percent increase in percent grafting efficiency are obtained when a monomer is then polymerized in the presence of the unsaturated poly(vinyl chloride) resin as compared to the case when the same amount of the same monomer is polymerized in the presence of the saturated poly(vinyl chloride) resin. In the former case a true graft polymer is produced; in the latter case, an over polymer is produced. Amounts of hydrogen chloride that can be removed from the saturated poly(vinyl chloride) for the purposes of this invention range from 0.01% to 10%. When above 10% of available hydrogen chloride is removed, the polymer tends to become crosslinked and gelled and therefore hard to process. The preferred range of removal of combined hydrogen chloride to create unsaturation in poly(vinyl chloride) is 0.1% to 5.0%.

DETAILED DESCRIPTION

A typical graft or over polymerization can be conducted as follows:

| Material | Parts |
|---|---|
| Porous poly(vinyl chloride) either untreated or dehydrochlorinated | 100 |
| Graft or over monomer | 40 |
| Free radical initiator | 0.3 |
| Water | 450 |

Dry resin is charged under nitrogen. The free radical initiator is preferably dissolved in the monomer and added under nitrogen with agitation. Cold water is added under nitrogen. The charge is agitated at 18° C.–20° C. for about 2 hours to insure complete mixing of monomer and polymer phases. The temperature is then raised to 50° C. and the reaction proceeds for about 20 hours.

This polymerization produces a mixture of pure homopolymer, and porous poly(vinyl chloride-g-polymer). The mixture is separated by extraction with a proper solvent. If styrene has been employed as the graft monomer, alpha, alpha, alpha-trifluoro toluene is an excellent solvent. It dissolves polystyrene, but does not affect poly(vinyl chloride-g-polystyrene). This solvent also completely dissolves poly(methyl acrylate), poly(vinyl acetate) and copolymers of poly(vinyl chloride)/poly(methyl acrylate) and poly(vinyl chloride)/poly(vinyl acetate).

The following examples will serve to illustrate the invention. Parts are given as parts by weight unless otherwise indicated.

EXAMPLE I

A five liter, 3-necked flask, equipped with thermometer, stirrer and water cooled condenser is charged with 1500 grams of porous, easy processing poly(vinyl chloride) resin (containing no unsaturation), suspension polymerized with a solvent viscosity of 1.02, and 2750 ml. of solvent grade ethylene glycol. The resin is added slowly to the glycol under a nitrogen atmosphere. Temperature is raised from room temperature to 180° C. in one hour, held at 180° C. for 4 hours, then dropped to room temperature in the final hour. The white resin turns cream, orange and brown as HCl is removed and unsaturation in the resin increases. The dehydrochlorinated resin is filtered, washed with methanol and with water and dried at 50° C. under vacuum. A nitrogen atmosphere is maintained at all times. The resin is completely soluble in cyclohexanone, and analyzes 1.35% volatiles by heat loss. Chlorine analysis is 56.42% chlorine. This indicates 0.31% chlorine lost based on theoretical chlorine content of 56.73%.

EXAMPLE II

Two series of polymerizations are run employing as a base resin in the first, or over polymerization, commercial porous poly(vinyl chloride) resin. In the second, or graft polymerization, series the base resin is the unsaturated porous poly(vinyl chloride) resin prepared in Example I. Three different free radical initiators, diisopropylpercarbonate (A,B) caprylyl peroxide, (C,D) and azo-bisisobutyronitrile, (E,F) are used. Polymerizations are run in bottles for 20 hours in a 50° C. constant temperature bath.

| Material | A | B | C | D | E | F |
|---|---|---|---|---|---|---|
| Porous poly(vinyl chloride) (Geon 101 EP *) | 100 | | 100 | | 100 | |
| Unsaturated poly(vinyl chloride) | | 100 | | 100 | | 100 |
| Styrene | 43 | 43 | 43 | 43 | 43 | 43 |
| Diisopropylpercarbonate | 0.3 | 0.3 | | | | |
| Caprylyl peroxide | | | 0.3 | 0.3 | | |
| Azobisisobutyronitrile | | | | | 0.3 | 0.3 |
| Percent conversion based on monomer used | 86.5 | 91.6 | 84.0 | 95.4 | 91.8 | 90.6 |
| Grams non-PVC polymer formed (combined and non-combined) | 37.2 | 39.3 | 36.1 | 41.0 | 39.5 | 38.9 |
| Grams non-PVC polymer attached to 100 g. backbone | 1.71 | 26.9 | 4.87 | 38.4 | 10.8 | 35.8 |
| Percent grafting efficiency | 4.6 | 68.4 | 13.5 | 93.8 | 27.3 | 92 |
| Percent increase in percent graft efficiency due to unsaturation | | 1,378 | | 594 | | 237 |

* Geon 101 EP = A product of B.F. Goodrich Chemical Company.

Conversion rates of the styrene monomer are seen to be uniformly high. However, when unreacted styrene and homopolymer of styrene are removed by dissolving them in alpha, alpha, alpha-trifluoro toluene and the percent grafting efficiencies are calculated, a remarkable difference is observed in the amounts of styrene which are homopolymerized and which are attached as a graft to the poly(vinyl chloride) backbone. Percent grafting efficiency is increased from 237% to 1378%, depending on the free radical initiator employed, when thermally unsaturated, dehydrochlorinated porous poly(vinyl chloride) polymer is used as the backbone instead of standard saturated porous poly(vinyl chloride).

Films, 0.20″ thick are prepared from these polymers by pressing 1 g. of powder between Teflon coated aluminum platens for 1 minute at 200° C. and 10,000 p.s.i. Films B, D, and F survive a full 180° bend. Films A, C and E are brittle and snap in two at bends of 90° and less.

A series of overpolymerized polymers is made on the saturated poly(vinyl chloride) and a comparable series of graft polymers is made on the unsaturated resin described above. The weight percent of over-polymer and graft polymer material is the same.

A measurement is made of Tg, the glass temperature or the temperature at which resin particles start to soften. When the over or graft monomer is a resin in its homopolymer form, it is expected to raise Tg compared to Tg of 95° C. for the plain poly(vinyl chloride) resins. When the over or graft monomer is a rubbery material in homopolymer form, it is expected to lower the Tg compared to that of poly(vinyl chloride).

| Monomer | Type of graft or over polymer | Weight percent of graft or over polymer | Tg over polymer, ° C. | Tg graft polymer |
|---|---|---|---|---|
| Methyl methylmethacrylate | Hard | 29.0 | 101 | 96 |
| Perfluoropropyl acrylate | Soft | 22.9 | 50 | 66.5 |

A given amount of hard graft polymer raises Tg more than the same amount of the same material as an over polymer.

A given amount of soft graft polymer lowers Tg more than the same amount of the same material as an overpolymer. It is apparent that more efficient use is obtained from the second material in relation to the poly(vinyl chloride) when the second material is employed according to the invention as graft polymer on the thermally dehydrochlorinated poly(vinyl chloride).

EXAMPLE III

The procedure of Example II is repeated using the same saturated and unsaturated porous poly(vinyl chloride) resins, isopropyl percarbonate (A,B) and caprylyl peroxide (C,D) free radical initiators, and methyl acrylate in place of styrene as the graft monomer.

| Material | A | B | C | D |
|---|---|---|---|---|
| Porous poly(vinyl chloride) | 100 | | 100 | |
| Unsaturated porous poly(vinyl chloride) | | 100 | | 100 |
| Methyl acrylate | 43 | 43 | 43 | 43 |
| Diisopropyl percarbonate | 0.3 | 0.3 | | |
| Caprylyl peroxide | | | 0.3 | 0.3 |
| Percent conversion based on monomer used | 99.3 | 85.7 | 97.0 | 97.4 |
| Grams non-PVC polymer formed (combined plus non-combined) | 42.7 | 36.8 | 41.7 | 41.9 |
| Grams non-PVC polymer attached to 100 g. backbone polymer | 15.6 | 23.0 | 16.0 | 36.3 |
| Percent grafting efficiency | 36.5 | 62.6 | 38.5 | 86.6 |
| Percent increase in percent graft efficiency due to unsaturation | | 71.5 | | 125 |

Again it is seen that deliberate creation of uniform unsaturation in porous poly(vinyl chloride) resin by controlled thermal dehydrochlorination results in a vast increase of percent grafting efficiency and amount of graft polymer actually bound to the porous poly(vinyl chloride) backbone structure.

A film pressed from Sample B is considerably more pliable than the corresponding film from Sample A.

EXAMPLE IV

The procedure of Example III is repeated using caprylyl peroxide (A, B) and asobisisobutyronitrile (C, D) as free radical initiators and vinyl acetate as the graft monomer.

| Material | A | B | C | D |
|---|---|---|---|---|
| Porous poly(vinyl chloride) | 100 | | 100 | |
| Unsaturated porous poly(vinyl chloride) | | 100 | | 100 |
| Vinyl acetate | 43 | 43 | 43 | 43 |
| Caprylyl peroxide | 0.3 | 0.3 | | |
| Azobisisobutyronitrile | | | 0.3 | 0.3 |
| Percent Conversion based on monomer used | 74.5 | 33.3 | 83.4 | 30 |
| Percent grafting efficiency | 52.0 | 82.0 | 57.2 | 91.0 |
| Percent increase in graft efficiency due to unsaturation | | 57.7 | | 59.1 |

The low percent conversion of monomer results in runs B and D are apparently due to a leakage of oxygen into the systems. The percent grafting efficiency is still much higher for the graft polymerization on unsaturated polymer backbone as compared to over polymerization on saturated polymer backbone and the percent increase in percent grafting efficiency is above 55%.

When a series of graft polymerizations on the unsaturated porous poly(vinyl chloride) resin of Example I is run in comparison with a series of over polymerizations on saturated porous poly(vinyl chloride) resin, employing a variety of monomers including dichlorodifluoro ethylene, ethyl acrylate, n-butyl acrylate, t-butyl acrylate, perfluoropropyl methacrylate, dibutyl itaconate and diethyl fumarate, the grafting efficiency data uniformly shows that greater amounts of monomer are added to unsaturated porous poly(vinyl chloride) backbone than are added to saturated porous poly(vinyl chloride) backbone polymer. The colored, unsaturated resin turns white as graft monomer reacts at the points of unsaturation and forms graft polymer side chains. Films prepared from these grafts are pliable, clear and transparent.

The melting temperature of the graft copolymer resin depends on the nature and amount of the non-poly(vinyl chloride) graft which forms the external phase of the material. Low melting homopolymers grafted to poly(vinyl chloride) impart a lower melting temperature to the graft copolymer than the backbone alone has, and conversely higher melting polymers can impart a higher melting temperature. Other properties are also additive. The rubbery acrylates give a tough pliable graft copolymer. Fluoro compounds give a slippery surface to objects made from their grafts. Fluoro carbons are very expensive and poly(vinyl chloride) is relatively inexpensive and one can obtain many of the desirable benefits of fluoro carbon polymers at low cost by this type of grafting.

Porous poly(vinyl chloride) has a high melt viscosity and cannot be injection molded unless a lower than normal molecular weight resin is used. The strength, solvent resistance and temperature stability of low molecular weight poly(vinyl chloride) are poorer than for poly(vinyl chloride) of normal molecular weight. By grafting polystyrene, polymethyl methacrylate or mixture of polystyrene and polymethyl methacrylate on to porous poly(vinyl chloride) backbone one can improve the melt viscosity of the porous poly(vinyl chloride) so that normal molecular weight polymers can be injection molded. The same technique will improve the surface quality of extruded samples and allows extruders to be run at higher output rates.

I claim:

1. The method of producing graft polymers of suspension and bulk poly(vinyl chloride) resin comprising the steps of (1) dehydrochlorinating said poly(vinyl chloride) through thermal dissociation of said resin under a nitrogen atmosphere as it is held in suspension in ethylene glycol and in the absence of other additives at about 180° C., and (2) subsequently graft polymerizing at least one polymerizable compound containing a terminal $CH_2=C<$ group on to the said dehydrochlorinated poly(vinyl chloride) resin by a free radical polymerization process.

2. The method of producing graft polymers of suspension and bulk polymerized poly(vinyl chloride) comprising the steps of (1) dehydrochlorinating said poly(vinyl chloride) by slow thermal dissociation at about 180° C. under a nitrogen atmosphere in a suspension of ethylene glycol and in the absence of other additives to form a colored resin and separating said resin from said ethylene glycol by filtration, (2) polymerizing on 100 parts of said dehydrochlorinated poly(vinyl chloride) resin at least 10 parts of a liquid monomer, said monomer containing at least one terminal $CH_2=C<$ group, (3) polymerizing said liquid monomer on said dehydrochlorinated poly(vinyl chloride) resin in water suspension in the presence of 0.01 part to 1.0 part per hundred parts of monomer of a free radical initiator.

3. The method of claim 2 wherein the liquid monomer is styrene.

4. The method of claim 2 wherein the liquid monomer is methyl acrylate.

5. The method of claim 2 wherein the liquid monomer is vinyl acetate.

6. The method of producing graft polymers of suspension and bulk polymerized poly(vinyl chloride) resin comprising the steps of (1) dehydrochlorinating said resin in a fluid suspension of ethylene glycol and in the absence of other additives at a temperature below the melting point of said resin by thermal dissociation and under a nitrogen atmosphere, (2) separating said dehydrochlorinated resin from said fluid, (3) graft polymerizing a monomer containing a terminal $CH_2=C<$ group on to the said dehydrochlorinated resin as a backbone polymer in a water suspension system in the presence of 0.01 part to 1.0 part per hundred parts of said monomer of a free radical initiator.

7. The method of producing graft polymers of suspension and bulk polymerized poly(vinyl chloride) resin comprising the steps of (1) dehydrochlorinating said resin by the removal of 0.1 to 10% of its combined chlorine as hydrogen chloride in a fluid suspension of ethylene glycol and in the absence of other additives at a temperature of about 180° C. by thermal dissociation under a nitrogen atmosphere (2) separating said dehydrochlorinated resin from said fluid, (3) graft polymerizing a monomer selected from the group consisting of styrene, methyl acrylate and vinyl acetate on to the said dehydrochlorinated resin in a water suspension system in the presence of 0.01 part to 1.0 part per hundred parts of said monomer of a free radical initiator whereby the product polymer is characterized by a percent grafting efficiency of 55% to 95% where percent grafting efficiency is defined as $$\frac{\text{Total wt. of non-PVC polymer} - \text{wt. of extracted homopolymer}}{\text{Total wt. of non-PVC polymer}} \times 100$$

References Cited

UNITED STATES PATENTS

| | | | |
|---|---|---|---|
| 2,606,177 | 8/1952 | Downing | 260—92.8 |
| 2,908,662 | 10/1959 | Rees | 260—884 |

FOREIGN PATENTS

| | | | |
|---|---|---|---|
| 242,258 | 12/1962 | Australia | 260—877 |

OTHER REFERENCES

Stille, J. K., Introduction to Polymer Chemistry, John Wiley and Sons, New York, 1962, page 66.

SAMUEL H. BLECH, Primary Examiner

J. SEIBERT, Assistant Examiner

U.S. Cl. X.R.

260—2.2, 33.2, 92.8